Oct. 18, 1927.

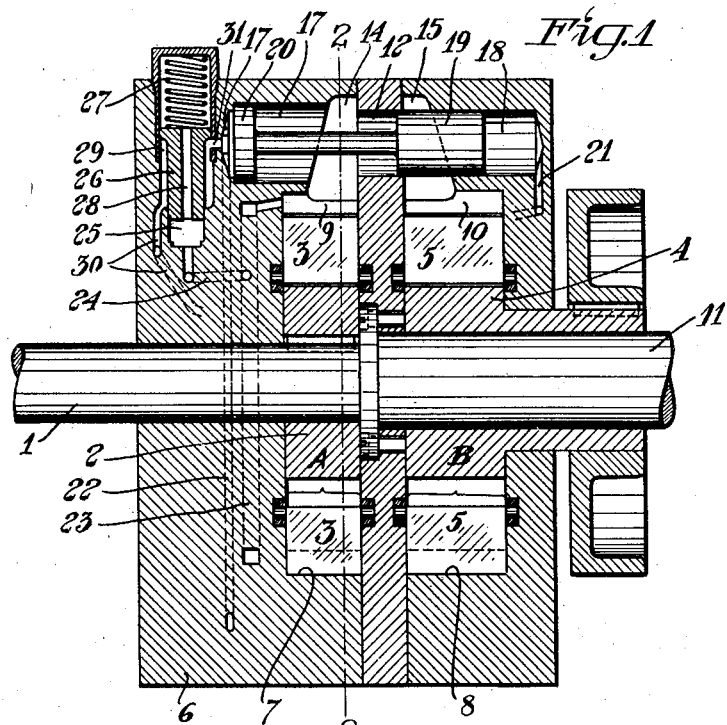
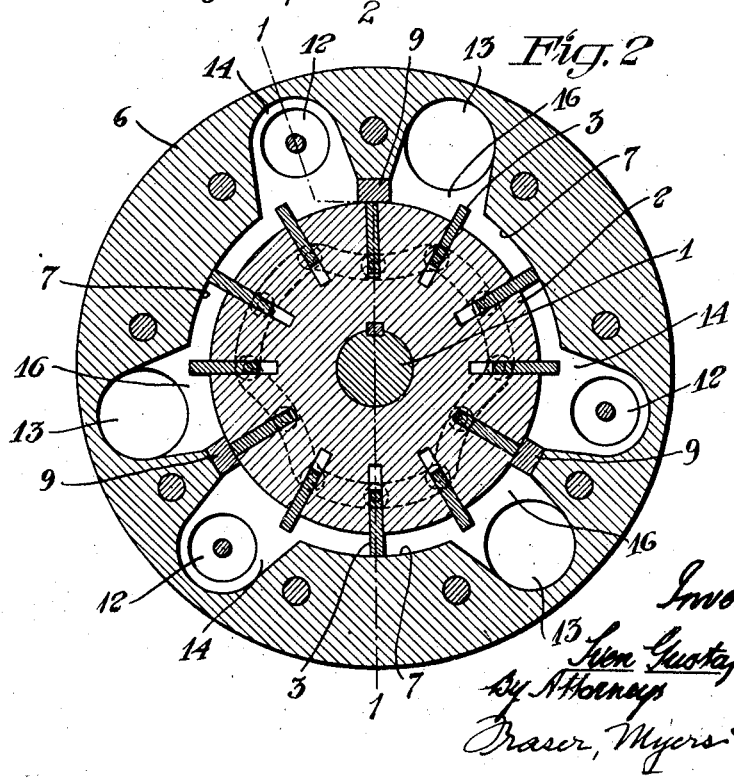

S. G. WINGQUIST 1,645,565

HYDRAULIC COUPLING AND CHANGE SPEED GEAR

Filed July 23, 1924   2 Sheets-Sheet 2

Inventor
Sven Gustaf Wingquist
By Attorneys
Fraser, Myers & Manley.

Patented Oct. 18, 1927.

1,645,565

UNITED STATES PATENT OFFICE.

SVEN GUSTAF WINGQUIST, OF GOTTENBORG, SWEDEN.

HYDRAULIC COUPLING AND CHANGE-SPEED GEAR.

Application filed July 23, 1924, Serial No. 727,689, and in Sweden August 8, 1923.

This invention relates to hydraulic coupling and change speed gears, comprising two or more pump elements or groups of pump elements and provided with valve devices for one or more of said pump elements, through the adjustment of which different transmission ratios are established.

The chief object of the invention is to achieve a simple and reliable change speed gear of the above-mentioned kind. According to one form of the invention there is provided a special control piston connected to, and cooperating with, the main valve between the pump elements. This special control piston, together with pressure-sensitive areas of the main valve to which said piston is connected, constitutes a hydraulically controlled main valve actuating device. This main valve actuating device is preferably under the control of an automatic auxiliary or pilot valve. This auxiliary valve is in turn controlled either by the fluid pressure or by centrifugal force, but preferably by both fluid pressure and centrifugal force so that in the latter case the adjustment of the main valve device is performed automatically at a certain pressure corresponding to a predetermined load, or at a certain centrifugal force due to a predetermined number of R. P. M., or at a certain combination of said forces. The various parts of the device are preferably so designed and related that one side of the special control piston actuating the main valve is always in permanent communication with the pressure chamber of the change speed gear while its other side, by means of the auxiliary valve, is alternately brought into communication with either the said pressure chamber or with the suction or idle fluid chamber of the transmission. By this arrangement the main valve control piston will either be subjected to two equal and opposite forces which neutralize each other, or it will be exposed to a one-side pressure and thus either alone or in combination with spring forces cause an adjustment of the main valve device connected to said piston.

In the annexed drawings some forms of embodiment of a hydraulic coupling and change speed gear according to this invention are shown. Fig. 1 is an axial section along the line 1—1 of Fig. 2 and shows a change speed gear according to the one form of embodiment.

Fig. 2 is a cross-section thereof along the line 2—2 of Fig. 1.

Figure 6:
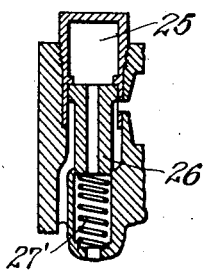
Fig. 6 is a fragmentary longitudinal section through the pilot or auxiliary valve and shows a modified spring arrangement.

The hydraulic coupling and change speed gear shown in Figs. 1 and 2, except for its novel automatic control features, is similar in principle to the structure disclosed in my application Serial No. 418,264, filed October 20, 1920, allowed August 20, 1926, which has matured into Patent No. 1,603,179, and my United States Patent No. 1,510,368, granted September 30, 1924. Various details of the present device form the subject-matter of my co-pending United States applications, Serial No. 575,673, filed July 17, 1922; Serial No. 621,577, filed February 27, 1923; Serial No. 688,248, filed January 24, 1924, and in my issued Patent No. 1,503,618, granted September 16, 1922.

The present transmission device comprises a driving rotor 2 connected to a driving shaft 1 and provided with radially movable working vanes 3; a stator 4, releasable for free rotation and having, as has the rotor 2, radially movable working vanes 5. The driven rotor 6, connected to a driven shaft 11, surrounds the rotor 2 and the stator 4 and is provided with working surfaces 7 and 8 and abutments 9 and 10, the elements 7, 9 and 8, 10 co-operating respectively with the vanes of rotor 2 and stator 4, to form two groups of pumps or what may be termed pumping stages. The two rotors, 2 and 6, form in this case a sliding-vane pump device A, and the stator 4 and the rotor 6 form a second sliding-vane pump device B. These sliding-vane pump devices have, as is apparent from Fig. 2, three poles, i. e., each of them is provided with three abutments and three working surfaces, three pressure channels 12 and three suction channels 13 connecting the pressure chambers 14 and 15 and the suction or idle fluid chambers respectively of the two pump devices. Only the three suction chambers 16 of the pump device A are visible on the drawing in Fig. 2.

The cylindrical pressure channels 12 lie parallel to the axis of the rotors and are extended, so that at their lefthand ends as well as a their ends toward the right, as shown in Fig. 1, are formed cylindrical cavities 17 and 18 respectively. The cavity 18 contains a valve body 19 and the cavity 17 a piston 20 rigidly secured to said valve body. The chamber 18 is permanently connected through a channel 21 to one or more suction chambers of the gear. The pressure chambers 14 and 15 of the two pump elements are widened, so that they are larger than the channel 12 in the partition between the pump elements to provide free flow of fluid therethrough when the valve is open. The valve body 19, in its lefthand position enters the bore 12, as shown in Fig. 1, and thus shuts off the connection between the pressure chambers 14 and 15.

The part of the chamber 17 located to the left of piston 20 is connected to all the chambers 17 by a channel 22. Further, there is provided a channel 23, which connects all three pressure chambers 14 of the pump element A, and which in turn, through a channel 24, is itself connected to a chamber 25 containing an auxiliary valve 26. Said auxiliary valve is pressed inward towards the centre by means of a spring 27 and is provided, as shown, with a through-going channel 28, by which means the upper side of the auxiliary valve is also exposed to the fluid pressure.

Within the chamber 25, the auxiliary valve 26, having towards the centre a less diameter than at its portion located outward towards the circumference, forms an annular chamber 29 which is connected through a channel 30 with one or more suction or idle fluid chambers of the gear. In the position shown in Fig. 1, the auxiliary valve 26 gives the chamber 29 access to channel 31, which, in turn, connects with channel 22 and that part of the cavity 17 which is located to the left of the main valve control piston 20. In the outer position of the auxiliary valve 26, the part of the cavity 17 to the left of piston 20 is connected with the suction chamber of the gear through the chamber 29 and the channel 30, whereas in the inner position of the auxiliary valve said channel 31 will be uncovered by the upper edge of said valve and thus will connect the said part of the cavity 17 with the pressure chamber of the gear through the channel 28 and the channels 24 and 23.

Obviously, the position of the auxiliary valve 26 will be determined by the resultant force due, on the one hand, to the combined action of spring 27 and the pressure of the fluid, which latter, because the upper pressure-sensitive surface of the auxiliary valve is larger than the lower or inner pressure-sensitive surface, also tends to move the valve inward towards the centre, and, on the other hand, to the opposing centrifugal force of the auxiliary valve caused by the rotation of the gear and which force tends to move the valve outward. Thus, if the centrifugal force due to the uniform rotation of the driven rotor 6, be maintained constant, a certain increase in fluid pressure will cause the valve to move inward. An increase now, in the number of R. P. M., will give rise to a greater centrifugal force which, if the auxiliary valve is to be retained in its inner position, will require an increase in the opposing fluid pressure.

It is evident that the spring 27 may also be arranged in such manner as to counteract the pressure and to assist the centrifugal force, for instance by being located in the inner part of the chamber 25, as shown in Fig. 6, the spring so arranged being designated 27'.

From the foregoing it is apparent, that the position of the auxiliary valve is determined by the general condition prevailing in the change speed gear, i. e., by the number of R. P. M. and the torque or fluid pressure resulting therefrom. The auxiliary valve will consequently admit either pressure or partial vacuum to the part of the cavity 17 located to the left of the piston 20, depending upon the prevailing conditions of torque and speed. According to Figs. 1 and 2, the piston 20 has a larger diameter than the main valve 19. The adjacent surfaces of said parts 19 and 20 are permanently exposed to the fluid pressure, which thus will hold the valve 19 in closed position, or close it if it be open, providing there is a reduced pressure to the left of the piston 20. If on the other hand, the full transmission pressure is admitted to the left of piston 20, as will always occur when auxiliary valve 26 is in its inner position, the opposing forces of the fluid acting on both faces of piston 20 will neutralize each other and the fluid pressure acting on the exposed surface of valve 19 will cause it to open as there is now no force opposing this motion.

The channels 22 and 23 obviously bring about perfect pressure equalization between the several pressure chambers connected thereby. Of course there is no reason why there may not be provided an auxiliary valve 26 for each main valve 19. There may also be used an auxiliary valve of various other forms.

Figure 3:
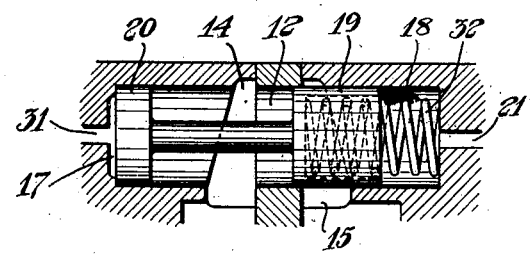
Fig. 3 is a fragmentary view of a similar change speed gear having a somewhat modified valve device.

Fig. 3 shows a modification of the main valve. The valve body 19 and the piston 20 have in this case the same diameter. A spring 32 is inserted to the right of the valve 19 in the chamber 18 and tends to close said valve. The difference in the mode of operation as compared with that of the valve shown in Figs. 1 and 2, is as follows: If atmospheric pressure or partial vacuum be admitted to the chamber 17 to the left of the piston 20, the moving of valve device 19, 20 to the left, will be insured by the action of spring 32 and the valve will close. If, however, the pressure due to the load, be increased to a certain value so that it, together with the spring 27, is able to overcome the centrifugal force of the auxiliary valve 26, the latter will be moved inward in the manner hereinbefore set forth and connect, through the channels 31, 28 and 23 the chamber 17 to the left of the piston 20 with the pressure chamber of the gear, so that the valve 19 will be opened against the action of the spring 32 and cause a cutting in of the pump device B and a consequent change of transmission ratio.

Figure 4:
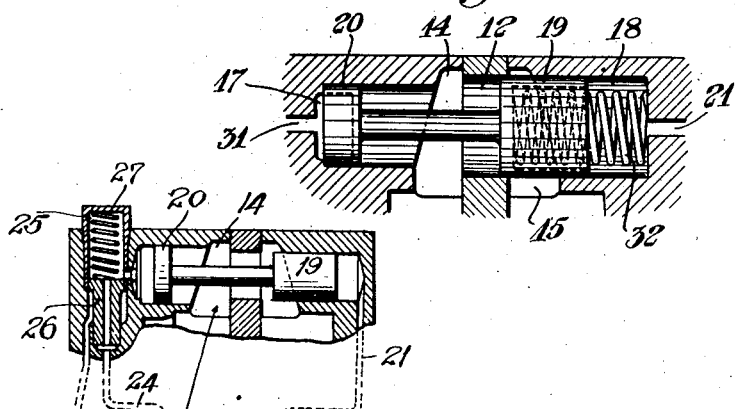
Fig. 4 is a view similar to Fig. 3, showing a further modification of the valve device.
Figure 5:
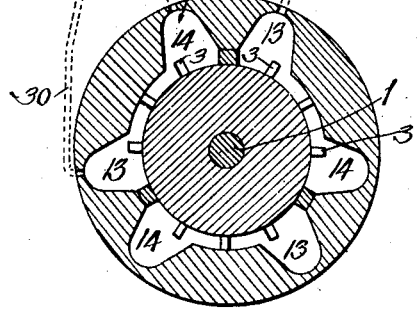
Fig. 5 shows the main and auxiliary valves in the position opposite to that shown in Figs. 1, 2, 3 and 4, and also diagrammatically indicates the connections of the valve conduits.

Fig. 4 shows a modification, in which the piston 20 has a less diameter than the valve 19. In this case the spring 32 should be so dimensioned that when pressure is admitted into the chamber 17 in front of the piston 20, the spring will be compressed by the pressure acting to the right on the larger face of valve 19, so that said valve will be opened. By suitably dimensioning the diameters of the piston 20 and the valve 19 and the strength of the spring 32, a co-operative relationship may be obtained whereby such pressure will be required, before the valve is opened, that unnecessary running at an increased transmission ratio will be avoided.

The valve device shown in Fig. 4 may also serve as a safety valve. At sufficiently high rotative speeds the auxiliary valve 26, if it be possessed of considerable mass, cannot be moved inward by a comparatively high, working pressure, to connect the chamber 17 with the pressure chamber 23. In the modification shown however, the valve 19 will be pressure actuated independently of its auxiliary control device above a certain pressure, because of the difference in size of the adjacent surfaces of the main valve 19 and the piston 20. Since the area of the valve is greater than that of the piston, it is apparent that the combined effect of the fluid pressure acting on their opposed surfaces will be a resultant force to the right. Because of this, at a certain predetermined pressure the main valve will be subjected to sufficient force to open it against the pressure of spring 32 and without the assistance of any fluid pressure whatever on the left face of piston 20. Thus at excessive pressures the main valve will open automatically and quite independently of the normal control of the auxiliary valve.

In the embodiment shown, a main valve 19 with piston 20 is provided in each of the pressure channels 12, all under the control of a single auxiliary valve. However, if desired, one auxiliary valve may be provided for each main valve.

It is evident that the automatic valve control hereinabove set forth is adapted to use in a variety of hydraulic transmission devices including those having three or more transmission ratios. The device may be otherwise embodied and variously modified without departing from the spirit of the invention as set forth in the following claims.

What I claim as new and desire to secure by Letters Patent of the United States of America is:

1. A hydraulic coupling and change speed gear having at least two pumping stages and provided with pressure-sensitive main valve means for controlling the flow of fluid between said stages, a control piston having opposed pressure-sensitive surfaces and connected to said main valve means, and auxiliary valve means, sensitive to fluid pressure and centrifugal force, and adapted in one position to connect a surface of said control piston with a pressure chamber of the gear, and in the other position to connect said surface with the suction or idle fluid chamber of the gear whereby the position of the main valve and its control piston is hydraulically determined in accordance with the position of the auxiliary valve.

2. A hydraulic coupling and change speed gear, according to claim 1, further characterized in that the surface of the said control piston opposite to that acted upon by fluid under the control of the auxiliary valve, is permanently connected with a pressure chamber of the gear.

3. A hydraulic coupling and change speed gear, according to claim 1, further characterized in that spring means are provided tending to hold the said auxiliary valve means in the position in which it connects the said surface of the control piston, with a pressure chamber of the gear.

4. A hydraulic coupling and change speed gear having not less than two pumping stages and provided with main valve means for controlling the flow of fluid between said pumping stages, a control piston having opposed faces and being operatively connected to said main valve means, and auxiliary valve means adapted to hydraulically control the position of said piston and main valve means.

5. A hydraulic coupling and change speed gear having at least two pumping stages and provided with pressure sensitive main valve means for controlling the flow of fluid between said pumping stages, a control piston connected to said main valve means, one face of said control piston and the effective pressure area of the said main valve means being permanently exposed to the fluid pressure within the gear, and auxiliary valve means adapted in one position to expose the other face of said control piston to the fluid pressure of the gear whereby the effect of pressure on both sides of the piston will be neutralized, the auxiliary valve means being further adapted in the opposite position to relieve said last-mentioned face of the control piston from fluid pressure whereby the piston will be subjected to pressure on only one side.

6. A hydraulic coupling and change speed gear, according to claim 5, further characterized in that the effective pressure area of the main valve means differs from that of the adjacent surface of its control piston.

7. A hydraulic coupling and change speed gear, according to claim 5, further characterized in that the effective pressure area of the main valve means is less than that of the adjacent surface of its control piston whereby the valve is rendered self-closing when pressure is applied to only one side of said piston.

8. A hydraulic coupling and change speed gear adapted to be placed between driving and driven shafts and comprising at least two cooperating pumps, fluid actuated main valves carrying control pistons and adapted to govern the flow of fluid between said pumps, auxiliary valve means sensitive to both fluid pressure and centrifugal force and rotating with a part of the gear, conduits connecting said auxiliary valve means with pressure and suction chambers of the gear, and ports connecting said auxiliary valve means with one face of the said main valve control pistons, the auxiliary valve means being adapted in one position to allow fluid under pressure to pass through said ports to the control pistons and in the other position to subject the control pistons to the reduced pressure of the suction chamber of the gear.

9. A hydraulic coupling and change speed gear according to claim 8, further characterized in that the said auxiliary valve means is rotated by a driven part of the gear.

10. A hydraulic coupling and change speed gear having driving and driven elements, pump means actuated by the difference in speed between said elements, pressure-sensitive main valve means for controlling the flow of fluid through said pump means, auxiliary valve means adapted to control the said pressure-sensitive main valve means hydraulically, and a spring tending to close the main valve.

11. A hydraulic coupling and change speed gear including at least two cooperating pumps and provided with a longitudinally counterbalanced piston valve, which valve controls the flow of fluid between the pumps by longitudinal movement, and an auxiliary pressure-sensitive control element connected to said counterbalanced valve whereby the valve is actuated.

12. A hydraulic coupling and change speed gear including at least two cooperating pumps and provided with a pressure-sensitive main valve for controlling the flow of fluid between said pumps, one face of said valve being exposed to the action of fluid pressure tending to open said valve, a control piston connected to said main valve and having two pressure-sensitive surfaces, one of which tends to oppose the said action of fluid pressure on the main valve, and the other to assist said action tending to open the main valve, and means adapted to connect the latter surface of the control piston either with the pressure or idle fluid side of the said pumps.

In testimony whereof I affix my signature.

SVEN GUSTAF WINGQUIST.